United States Patent
Tsai

[11] Patent Number: 5,816,969
[45] Date of Patent: Oct. 6, 1998

[54] DRIVING APPARATUS FOR A FLATBED SCANNER

[75] Inventor: Jenn Tsair Tsai, Taoyuan, Taiwan

[73] Assignee: Muskek Systems, Inc., Hsinchu, Taiwan

[21] Appl. No.: 734,680

[22] Filed: Oct. 21, 1996

[51] Int. Cl.⁶ ............................... F16H 7/00; F16H 7/12; F16H 7/24
[52] U.S. Cl. ............................ 474/87; 474/137; 474/450
[58] Field of Search .................. 474/87, 137, 138, 474/139, 148, 150

[56] References Cited

U.S. PATENT DOCUMENTS

| | | | |
|---|---|---|---|
| 2,992,965 | 7/1961 | Hornbostel et al. | 474/137 |
| 3,338,104 | 8/1967 | Drain | 474/87 |
| 3,709,062 | 1/1973 | Draege | 474/87 |
| 3,854,344 | 12/1974 | Kohno et al. | 474/150 |
| 3,892,140 | 7/1975 | Fox et al. | 474/139 |
| 3,951,006 | 4/1976 | Fisher et al. | 474/87 |
| 4,351,636 | 9/1982 | Hager | 474/138 |
| 4,459,123 | 7/1984 | Tatsunaka et al. | 474/87 |
| 4,466,803 | 8/1984 | Wilson | 474/138 |
| 4,502,345 | 3/1985 | Butterfield | 474/87 |
| 4,854,921 | 8/1989 | Kunm | 474/138 |
| 5,628,704 | 5/1997 | Fischler et al. | 474/138 |

FOREIGN PATENT DOCUMENTS 0090448  6/1982  Japan ..................... 474/137

*Primary Examiner*—Charles A. Marmor
*Assistant Examiner*—Matthew A. Kaness
*Attorney, Agent, or Firm*—Merchant, Gould, Smith, Edell, Welter & Schmidt, P.A.

[57] ABSTRACT

A driving apparatus for a double carriage scanner drives the lamp carriage and the optical carriage in tandem. The driving apparatus is located at one side of the scanner housing for ease in assembly and maintenance. It consists of a pulley assembly and a closed-loop conveying device which engages the pulley assembly in a manner that the lamp carriage advances one unit distance while the optical carriage one half unit distance in synchronism and in the same direction.

5 Claims, 4 Drawing Sheets

DRIVING APPARATUS FOR A FLATBED SCANNER

BACKGROUND OF THE INVENTION

A. Field of the Invention

The invention relates to a driving device for a flatbed scanner, especially to a closed-loop conveying device for driving a lamp carriage to move one unit distance while an optical carriage to move half unit distance in synchronism and in the same direction.

B. Description of the Prior Art

According to the driving device for a conventional flatbed scanner, the scanners can be classified into two types: single carriage scanner and double carriage scanner. A single carriage scanner is usually larger than a double carriage scanner because all the optical members are installed in a single carriage with a fixed light path among each optical member. A double carriage scanner includes a carriage for optical members and the other carriage for illumination. The double carriage scanner can reduce the size of a scanner because its optical members are modularized.

The double carriage scanner comprising at least a lamp carriage, an optical carriage and a driving device. To maintain a stable light path, the driving device must be able to move the lamp carriage one unit distance while the optical carriage half unit distance in synchronism and at the same direction. Since the driving device must be made with great precision, it is usually made of roller slide shaft model or steel-wire-rope plus pulley model. Nevertheless, the cost for either one is very high. Refer to FIG. 1A to FIG 1D for an example of a driving device of the steel-wire-rope plus pulley model.

As FIG. 1A and FIG 1D shows, the lamp 102 is attached to the lamp carriage 101 for providing light source. The optical carriage 103 is for reflecting the light beams. The pulleys 104, 105, 106, 107 are located at the corners and connected to one another via a steel wire rope 108. The steel wire rope 108 also connects to lamp carriage 101 and optical carriage 103 for driving them at a stable speed. The complex structure of the driving device has several disadvantages for the double carriage scanner. It is difficult to assemble because each part of the driving device must be put together with extremely precision, inevitably raising the manufacture cost of the apparatus. Furthermore, the apparatus requires a high maintenance fee.

SUMMARY OF THE INVENTION

Accordingly, it is an object of the present invention to simplify the structure of the driving device for a double carriage scanner thereby to reduce its manufacture cost and maintenance fee.

It is another object of the present invention to provide a closed-loop driving device for a double carriage scanner which is simple and capable of providing stable light path.

According to the objects described above, the invention intends to simplify the structure of a conventional driving device so as to make the scanner more easy to assemble and maintain. The invention mainly encompasses a master gear, a plurality of slave pulleys, a pair of reduction gears and a closed-loop conveying device. The closed-loop conveying device connecting to the gear set in a specific order so that when the lamp carriage moves ahead for one unit distance, the optical carriage moves just half unit distance in synchronism and in the same direction.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

The invention takes the advantage of the structure of the pulley set and a closed-loop conveying device for moving the lamp carriage at one unit distance while the optical carriage at half unit distance in synchronism and in the same direction. The invention guarantees a stable light path while the carriages are moving along the original sheet for scanning. In addition, the parts embodying the invention are all allocated at the same side of the main housing. Thus, the assembly and maintenance can be made more easily.

Figure 1A:
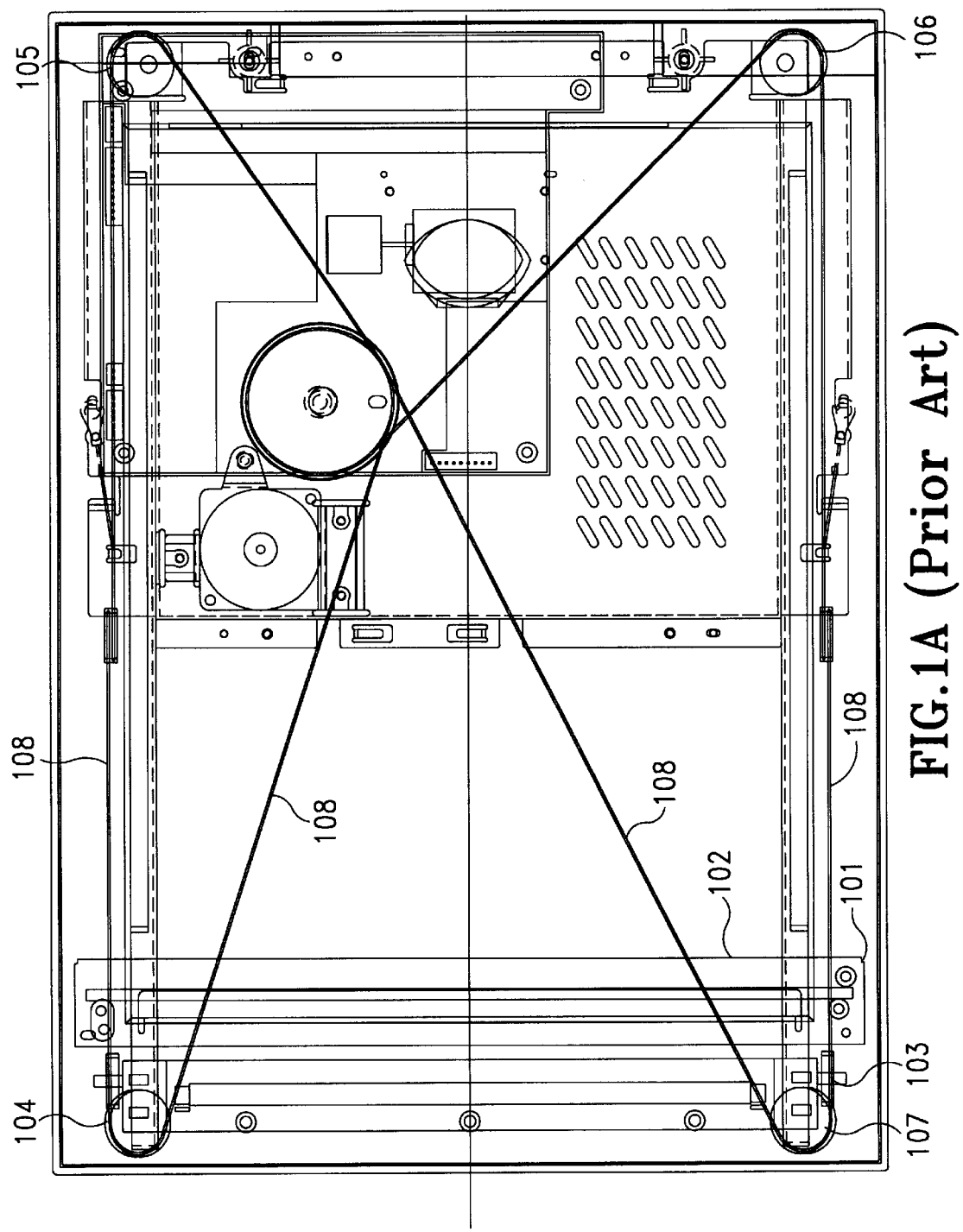
FIG. 1A is a perspective top view showing the driving device of a conventional double carriage flatbed scanner.
Figure 1C:
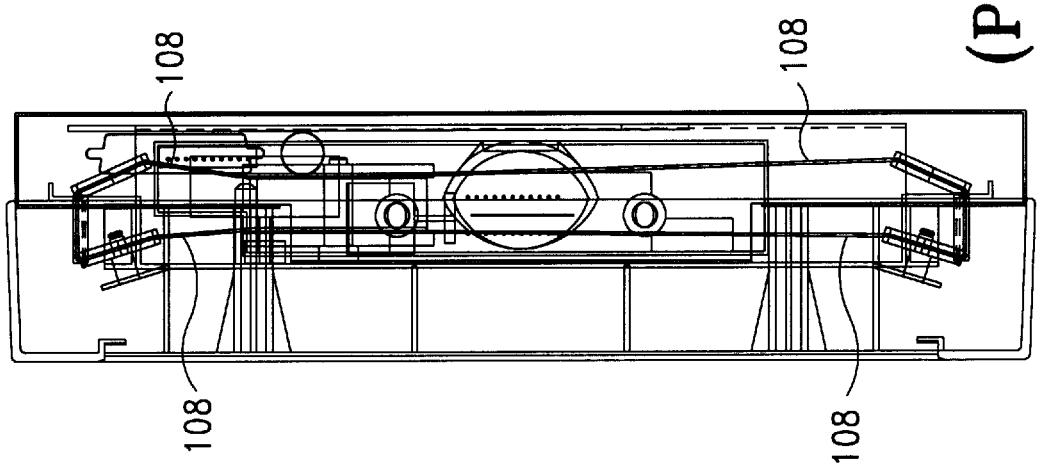
FIG. 1C is a perspective right side view showing the structure of the conventional flatbed scanner.
Figure 1B:
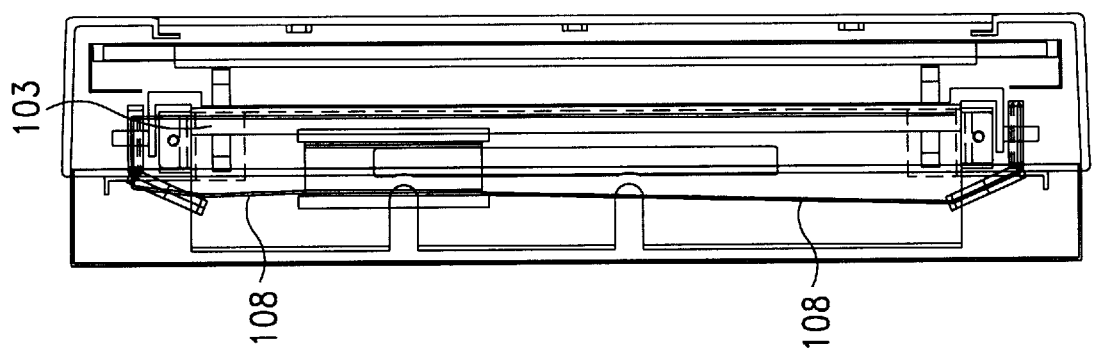
FIG. 1B is a perspective left side view showing the structure of the conventional double carriage flatbed scanner.
Figure 1D:
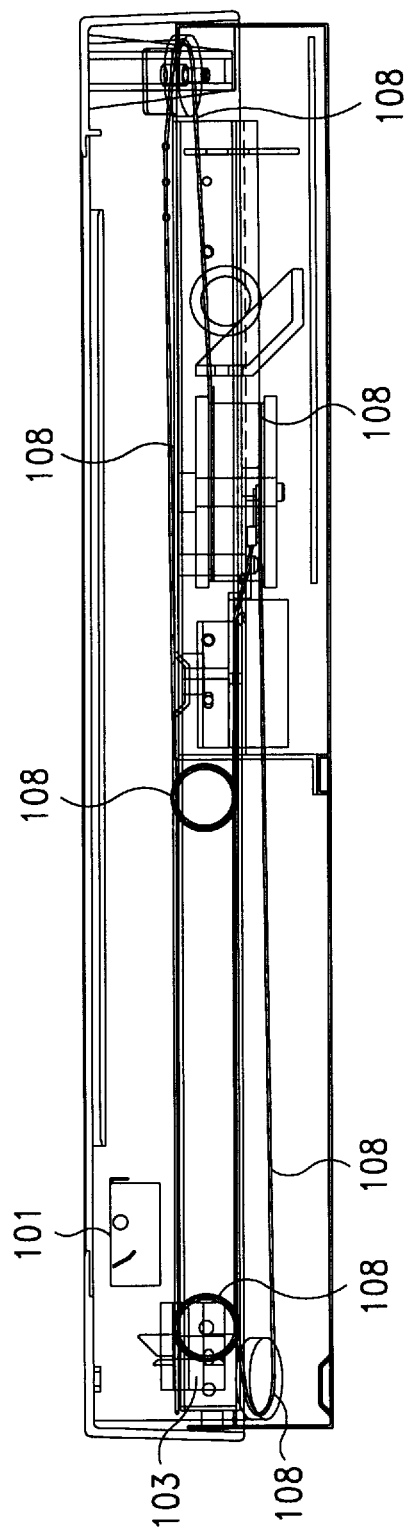
FIG. 1D is a perspective front view showing the structure of the conventional double carriage flatbed scanner.
Figure 2:
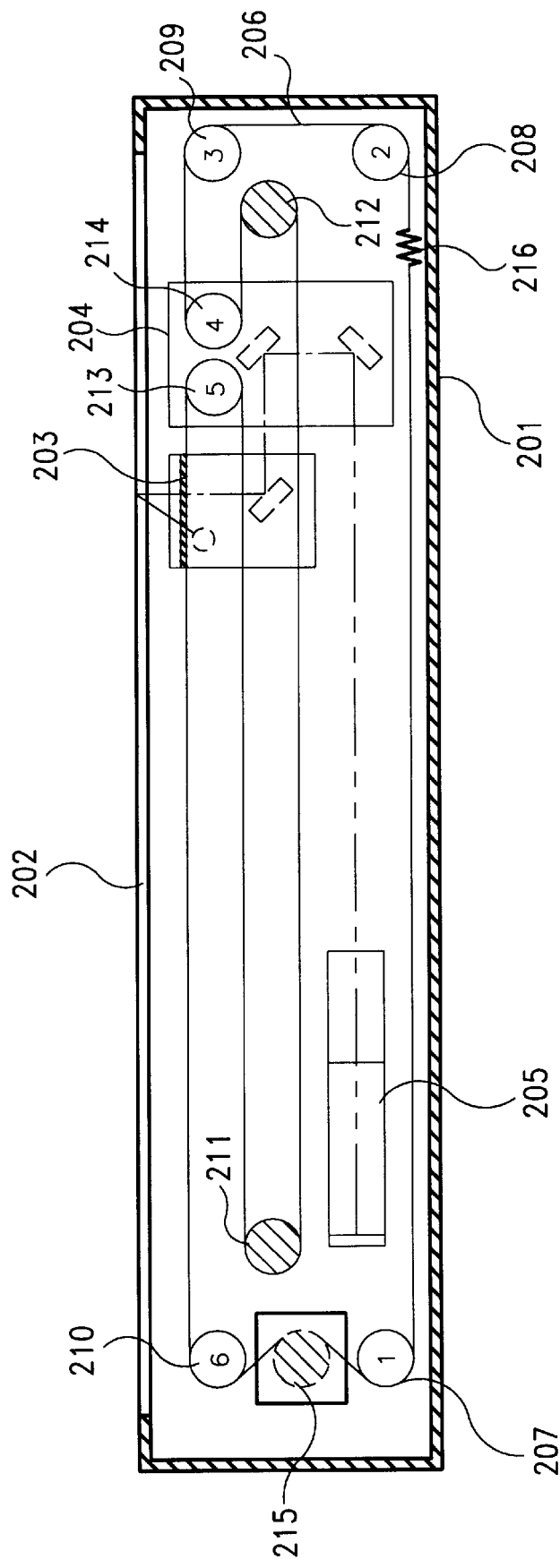
FIG. 2 is a sectional schematic view showing the structure of the drivung device embodying the present invention.

Refer to FIG. 2 for the structure of the invention. The elements of a scanner are installed in the housing 201. There is a transparent document tray 202 on top of the housing 201 for placing an original sheet. Inside the housing 201, there is a lamp carriage 203, an optical carriage 204, a photoelectric converting device 205, and a closed-loop conveying device 206.

The lamp carriage 203 and the optical carriage 204 are mounted on a support (not shown) with a proper distance for a stable light path. There are four slave pulleys 207, 208, 209, 210 located at the corners of the housing 201. A pair of idle pulleys 211, 212 are installed horizontally and close to the middle part of the housing 201 having one on the right side and the other on the left side. A pair of reduction pulleys 213, 214 are mounted symmetrically on the same side of the optical carriage 204. The closed-loop conveying device 206 connects slave pulleys 207, 208, 209, 210, reduction pulleys 213, 214, idle pulleys 211, 212, the lamp carriage 203, and the optical carriage 204 in a specific order. It starts from first slave pulley 207, via second slave pulley 210, lamp carriage 203, to first reduction pulley 213, and then turns back to first idle pulley 211, second idle pulley 212, and then to second reduction pulley 214, third slave pulley 209, fourth slave pulley 208, and finally to first slave pulley 207. Consequently, the conveying device 206 is in a closed-loop shape which can connect all pulleys and two carriages in a very simple way.

The driving power of the closed-loop conveying device 206 comes from the master gear 215. The master gear 215 is a teeth pulley which connects to a motor (not shown). The motor can change the rotation directions of the master gear 215. When the process of scanning begins, master gear 215 rotates in clockwise direction which causes fourth slave pulley 210 to rotate at the same time. As fourth slave pulley 210 rotates in counterclockwise direction, the lamp carriage 203 moves forward one unit distance. The rotation of the fourth slave pulley 210 also causes the rotation of first reduction pulley 213. According to the principle of pulleys, as the first reduction pulley 213 rotates in counterclockwise direction, the optical carriage will moves forward half unit distance at the same time. This continues until the scanning is finished.

When the scanning is finished, master gear 215 rotates in counterclockwise direction which causes forth slave pulley 210 to rotate in clockwise direction. As the fourth slave pulley 210 rotates, the lamp carriage 203 will be pulled backwards one unit distance while the optical carriage 204 be pulled backwards half unit distance at the same time. Since the backward and forward motion of the closed-loop conveying device 206 will make the closed-loop conveying device 206 easy to get loose, we may install a spring clamp 216 close to second slave pulley 208 to maintain the tension of the closed-loop conveying device 206.

The light path remains stable during the scanning process. When scanning, the document is placed on top of the document tray 202. The lamp carriage 203 emits light rays upwards to the document. The reflective image of the document is reflected to photoelectric converting device 205 through the optical carriage 204. Then, the photoelectric converting device 205 reads the image information and then converts it to electrical signals.

The invention has the advantage of simple structure. The closed-loop structure for the conveying device can provide the smooth motion for the lamp carriage and the optical carriage. Therefore the light path can be very stable. Besides, since the conveying device and its related elements are all at the same side of the housing, the assembly and maintenance will be much easier. Thus, the manufacture cost and maintenance fee can be reduced thereby.

It should be understood that various alternatives to the structures described herein may be employed in practicing the present invention. For instance, it will be easy for those skilled in the art to understand that the driving power of the closed-loop conveying device can also be implemented on either one of those slave pulleys or the idle pulleys as long as it can drive the closed-loop conveying device. The structure disclosed in FIG. 2 is only a preferred embodiment of the present invention. Moreover, installing a spring clamp is not the only way for maintaining the tension of the closed-loop conveying device. We can also implement a spring on the back end of a pulley to get the same result. It is intended that the following claims define the invention and that the structure within the scope of these claims and their equivalents be covered thereby.

What is claimed is:

1. A driving apparatus located inside a housing of a double carriage scanner for driving a lamp carriage and an optical carriage in tandem, wherein said double carriage scanner having at least a housing, a glass table on top of said housing, a photoelectric converting means mounted on the inner bottom of said housing, a lamp carriage, and an optical carriage, comprising:

a plurality of slave pulleys circumscribing a longitudinal side of said housing;

a pair of reduction pulleys mounted on the same side of said optical carriage;

two idle pulleys disposed parallel to each other and at opposite sides of said housing;

closed-loop conveying means having a first portion connecting said lamp carriage, engaging one of said pair of reduction pulleys and one of said idle pulleys through a first substantial arc of 180° in a first direction, and second portion engaging the other one of said pair of reduction pulleys and the other one of said idle pulleys through a second substantial arc of 180° in a second direction, a third portion connecting said two idle pulleys, a fourth portion connecting to said first portion, a fifth portion connecting to said second portion, and a sixth portion connecting to said fourth portion and said fifth portion; and a master gear connected to a portion of said closed-loop conveying means for driving said lamp carriage one unit distance and said optical carriage one half unit distance in synchronism and in the same direction.

2. The apparatus as claimed in claim 1, wherein said closed-loop conveying means is an endless belt.

3. The apparatus as claimed in claim 1, wherein said slave pulleys, said pair of reduction pulleys, and said two idle pulleys are all located at the same side of said housing.

4. The apparatus as claimed in claim 1, wherein said pair of reduction pulleys rotate in opposite directions.

5. The apparatus as claimed in claim 1, wherein said two idle pulleys rotate in opposite directions.

* * * * *